United States Patent [19]

Glaser et al.

[11] 4,116,475
[45] Sep. 26, 1978

[54] DIRECT CONNECTION CO-AXIAL FITTING FOR INJECTION LUBRICATOR

[75] Inventors: Marshall H. Glaser, Birmingham; Patrick L. Jeakle, Sterling Heights, both of Mich.

[73] Assignee: Orsco, Inc., Troy, Mich.

[21] Appl. No.: 730,968

[22] Filed: Oct. 8, 1976

[51] Int. Cl.² ............................................. F16L 39/00
[52] U.S. Cl. .............................. 285/133 R; 285/181
[58] Field of Search ............... 285/133 R, 138, 181, 285/134, 94, 333 A, 347, 379, 335, 371; 184/7 D, 55 A

[56] References Cited

U.S. PATENT DOCUMENTS

| 1,649,177 | 11/1927 | Murphy | 285/181 X |
| 2,307,427 | 1/1943 | Smith et al. | 285/133 R |
| 3,638,970 | 2/1972 | Sundquist | 285/133 R |
| 3,691,621 | 9/1972 | Weston | 285/138 X |
| 3,820,827 | 6/1974 | Boelkins | 285/133 R |

FOREIGN PATENT DOCUMENTS

| 255,686 | 1/1913 | Fed. Rep. of Germany | 285/133 R |
| 1,947,230 | 1/1971 | Fed. Rep. of Germany | 285/133 R |

*Primary Examiner*—Dave W. Arola

[57] ABSTRACT

A "direct connection" fitting for co-axial outlets from an Injection Lubricator simultaneously engaging external air passage and internal lubricating oil passage outlets by the simple expedient of engaging an outer male and female threaded connection between the Injection Lubricator and any of several alternative fittings, thereby eliminating previously required preliminary internal flexible tube connections for the internal oil passage.

13 Claims, 3 Drawing Figures

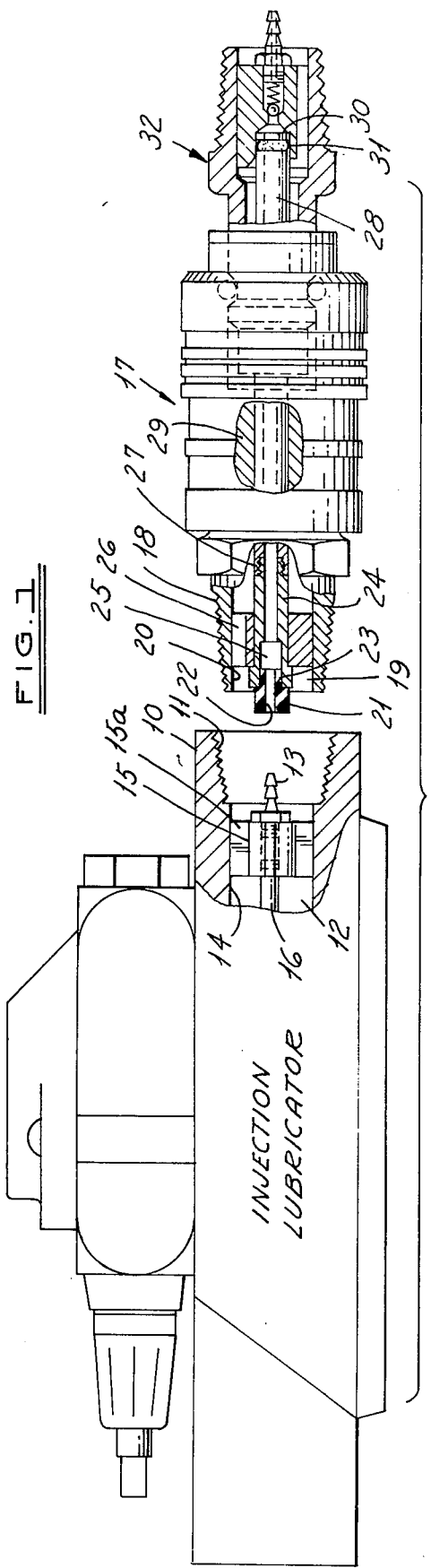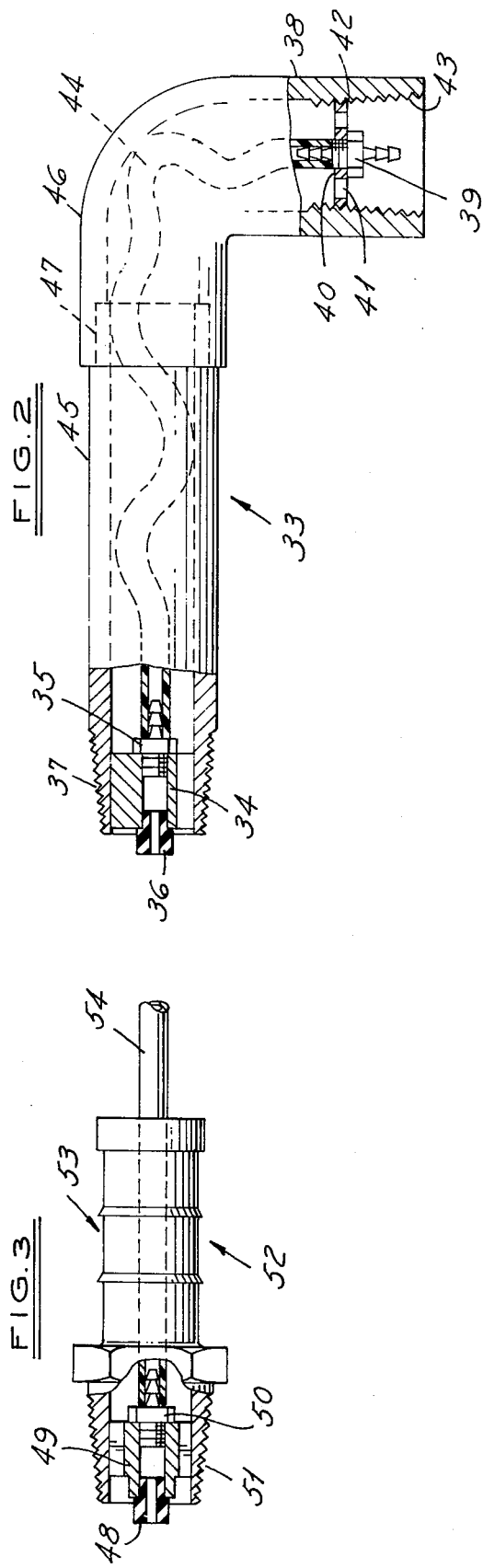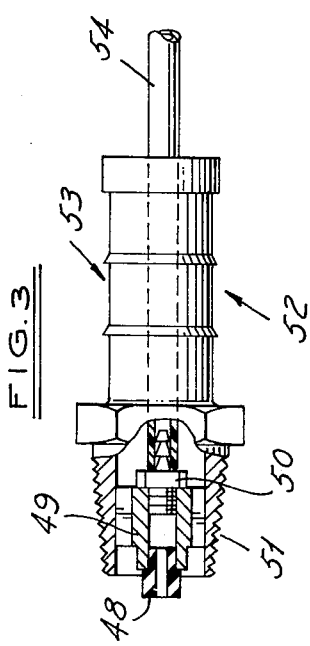

DIRECT CONNECTION CO-AXIAL FITTING FOR INJECTION LUBRICATOR

BACKGROUND OF THE INVENTION

Automatic Injection Lubricator systems have been developed for air driven power tools involving co-axial external air and internal capillary tube lubricating oil passages such as disclosed in U.S. Pat. Nos. 3,421,600, 3,389,799 and 3,731,763. The Injection Lubricators involve an outlet for air comprising a conventional threaded fitting connection with a centrally mounted internal aperture barbed insert for a capillary tubing connection. In the use of such system with an air hose line of substantial length between the Injection Lubricator and the air driven tool, it is common practice to feed the capillary tube through the air hose until it is accessable at both ends and there is no difficulty in applying one end of the capillary tube to the barbed insert within the Injection Lubricator, as well as at the air tool end of the hose. However in applications where a "quick disconnect" fitting is provided at the Injection Lubricator end of the air hose, such as disclosed in U.S. Pat. No. 3,820,827, considerable difficulty has been encountered in making the required short capillary tube connection between the barbed insert of the Injection Lubricator and a similar barbed connection within that portion of the quick disconnect fitting which engages the Injection Lubricator since the very limited intervening space between the adjacent barbed inserts inherently restricts the length of the capillary tube connection therebetween and renders the preliminary connection of the capillary tube a painstaking delicate operation with considerable uncertainty of success as well as a distinct possibility of kinking or disconnection during completion of the threaded fitting connection. Thus, although once installed provision is made for the automatic coupling of the internal tube passage within the separable portions of the quick disconnect coupling, the necessity for the initial short capillary tube connection at the Injection Lubricator has severely impared the utility of the quick disconnect coupling and in practice resulted in a very large percentage of Injection Lubricators equipped with quick disconnect couplings having the capillary tube lines unattached or inoperative due to kinking.

SUMMARY OF THE INVENTION

The present invention is directed to the specific problem described above and a solution therefore applicable to existing Injection Lubricators which completely eliminates the necessity for fitting a short length of capillary tubing between the barbed insert of the Injection Lubricator connection and a similar barbed insert in the adjacent portion of a quick disconnect coupling. This has been accomplished by rigidly mounting an apertured rubber grommet form of special tip within the threaded end of the disconnect coupling portion which engages the Injection Lubricator in such a position that it will automatically extend over and provide a sealed connection with the barbed insert of such Injection Lubricator upon merely threading such quick disconnect portion into the Injector Lubricator. The complete elimination of any intermediate short tubing results in a positive fool-proof automatic connection of the internal lubricator line assuring positive leak-proof connection therefrom through the quick disconnect coupling and thus to the operating tools served thereby.

Several optional adaptations of the "direct connection" include a 90° elbow having the "direct connection" tip at one end for engagement with the Injection Lubricator outlet and a conventional barbed insert at the other end for receiving the "direct connection" end of a co-axial quick disconnect coupling; or the "direct connection" feature may be incorporated in the threaded end of a co-axial nipple having a length of capillary tubing projecting therefrom for insertion in and through an air hose which may then be applied and clamped to the nipple in which case a quick disconnect fitting may be applied at the other end of the air hose.

BRIEF DESCRIPTION OF THE DRAWINGS

FIG. 1 is a schematic side elevation of an Injection Lubricator with a fragmentary sectional portion illustrating the co-axial outlets for air and lubricant and a quick disconnect coupling with a fragmentary sectional end shown in adjacent relation to the Injection Lubricator;

FIG. 2 is a side elevation of a 90° elbow adapted for direct connection to the Injection Lubricator; and FIG. 3 is a partially sectioned side elevation of a nipple adapted for direct connection to the Injection Lubricator with extending capillary tubing adapted for insertion in and through an air hose.

DESCRIPTION OF THE PREFERRED EMBODIMENTS

With reference to FIG. 1 of the drawings the Injection Lubricator is conventional and includes an air outlet fitting 10 having a female pipe thread 11 at the outlet end of air passage 12 as well as a centrally located barbed insert 13 centrally rigidly mounted within the cylindrical wall 14 by a locator 15 having three projecting legs 15a designed for free passage of air. The apertured barbed insert 13 communicating with the lubricant tube 16 conducts the intermittantly injected lubricant in accordance with the aforementioned Injection Lubricator patents.

A quick disconnect co-axial coupling socket 17 has one end adapted with a male pipe threaded fitting 18 to engage the female thread 11 of the Injection Lubricator and has an air passage 19 communicating with the air passage 12 of the Injection Lubricator when the coupling is fully engaged. Rigidly mounted co-axially within the cylindrical wall 20 of the air passage 19 is a resilient preferably soft nitrile rubber button or grommet 21 having a central aperature 22 and a reduced section 23 providing a shoulder engagement with the end of a metal tube 24 and a cemented engagement with a counterbore 25 of such tube. The tube 25 in turn is centrally located within a three legged locator 26 engaging the outer wall of the air passage 20. The inner end 27 of the tube 24 is threaded to engage one end of a connecting metal tube 28 which extends through the socket 17, is rigidly centered by an intermediate locator 29, and has a projecting end 30 provided with a rubber O-ring 31 for sealing engagement with an outer plug portion 32 as disclosed in said U.S. Pat. No. 3,820,827.

With this construction it will be seen that no short flexible capillary tube section is required between the barbed insert 13 and adjacent end of the quick disconnect coupling socket 17 and that upon simply engaging the threaded connection 11, 18, the rubber grommet 22 will automatically align, passover and sealingly engage the barbed end of the insert 13 to establish a sealed passage for the lubricant there between, the rigid location of the resilient grommet 22 and the engaging barbed insert 13 together with the aligning action of the respective pipe threads providing adequate piloting to assure proper penetration and sealing engagement between the rubber grommet and barbed end of the mating elements.

FIGS. 2 and 3 illustrate similar "direct connection" constructions for alternate 90° elbow and co-axial nipple fittings. In the case of the 90° elbow 33 the three legged locator 34 is adapted to dispense with the intermediate tube 24 employed in the FIG. 1 embodiment and directly mount a barbed insert 35 threaded into the inner end and a rubber grommet 36 cemented into the outer end so that a "direct connection" to the Injection Lubricator may be made through engagement of the male pipe thread 37 with the thread 11 as in the case of the FIG. 1 embodiment.

At the discharge end 38 of the elbow 33 a double barbed insert 39 is threaded into a locator 40 having a plurality of air passage holes 41 and an annular thread 42 having a pitch adapted to bottom out in a tapered pipe thread 43 providing a rigid mounting for the barbed insert 39, similar to the insert 13 of FIG. 1, to which a quick disconnect coupling such as 17 illustrated in FIG. 1 may be attached as in the case of the "direct connection" to the Injection Lubricator. An appropriate length of flexible capillary tubing 44 is applied to the barbed ends of the respective inserts 39 and 35 prior to assembly of the straight and 90° bend portions 45, 46 of the elbow which are suitably joined at 47 by a press fit, soldered joint or other suitable means, the overlap extending for only a short distance so that the surplus flexible tubing 44 can be accommodated within the open air passage surrounding same.

In the case of FIG. 3, a rubber grommet 48, locator 49 and barbed insert 50 identical to that shown in FIG. 2 is installed within the tapered thread end 51 of a nipple 52 having an outer surface 53 adapted for a flexible hose connection. In this case a suitable length of capillary tubing 54 is applied to the barbed end of the insert 50 and fed throughout the length of hose to be applied to the nipple before applying and clamping the end of the hose to the surface 53. Here again the nipple may be directly applied to the Injection Lubricator in the same manner as the other embodiments and, among the three alternatives, a "direct connection" to the Injection Lubricator for virtually any requirement can thus be provided.

We claim:

1. A co-axial direct connection fitting for dual fluid passage coupling with an Injection Lubricator, said Lubricator having means rigidly associating co-axial external air and internal lubricating fluid outlets, said external outlet including a threaded coupling element, said internal outlet terminating in a rigid relatively small diameter centrally located tubular coupling element, said fitting being characterized by means rigidly associaing co-axial external air and internal lubricating fluid inlets, said external inlet having means for sealed coupling with said external outlet including a threaded coupling element adapted to co-axially matingly engage said outlet threaded element upon rotation and thread produced axial displacement relative thereto, and said internal lubricating fluid inlet having means for sealed coupling with said internal outlet including a centrally located resiliant grommet adapted to directly align, overpass and sealingly connect with said outlet tubular element as a direct result of said co-axial mating engagement and thread produced axial displacement.

2. A fitting as set forth in claim 1 wherein said means rigidly associating co-axial external air and internal lubricating fluid outlets includes a rigidly retained rigid tubular element means within said external fluid inlet for retaining said grommet.

3. A fitting as set forth in claim 2 wherein said means rigidly associating co-axial external air and internal lubricating fluid outlets includes an air passing centralizing locator means for rigidly retaining said grommet retaining tubular element.

4. A fitting as set forth in claim 2 wherein said means rigidly associating co-axial external air and internal lubricating fluid outlets includes a tri-legged aperatured locating element means for centrally rigidly retaining said grommet retaining tube element.

5. A fitting as set forth in claim 2 including a rigid extension tubular element projecting throughout and extending beyond the outlet end of said fitting.

6. A fitting as set forth in claim 5 including a co-axial quick disconnect dual fluid passage plug element for connection with said fitting including a lubricating fluid sealing connection with said tubular extension element.

7. A fitting as set forth in claim 5 including an intermediate locator element spaced from the ends of said fitting for centrally locating said extension tubular element in rigid relation with said fitting.

8. A fitting as set forth in claim 1 including an angular elbow, and having means rigidly associating co-axial external air and internal lubricating fluid outlets operatively equivalent to said Injection Lubricator outlets.

9. A fitting as set forth in claim 8 including a flexible internal capillary tube connecting the lubricating fluid inlet and outlet of said elbow.

10. A fitting as set forth in claim 9 including rigid internal inlet and outlet lubricating fluid tubular elements operatively equivalent to said internal lubricating fluid outlet for said Injection Lubricator.

11. A fitting as set forth in claim 10 including intermediate overlapping mating straight and elbow sections assembled to provide an integral elbow fitting with said capillary tube preassembled therewithin.

12. A fitting as set forth in claim 1 having its external end remote from said Injection Lubricator adapted for connection to an external flexible hose, and having an adapter for capillary tubing at the outlet end of said grommet retaining tube, and capillary tubing connected to said adapter having a length adapted to pass entirely through a flexible hose of substantial length.

13. A fitting as set forth in claim 1 wherein said threaded external elements of said fitting and Injection Lubricator are respectively male and female.

* * * * *